United States Patent
Tombelli et al.

(10) Patent No.: US 11,945,317 B2
(45) Date of Patent: Apr. 2, 2024

(54) INDUCTIVE POWER TRANSFER SYSTEM FOR DERATING A BATTERY CHARGING PROFILE OF ELECTRIC VEHICLE BATTERIES AND CONTROL METHOD THEREOF

(71) Applicant: ABB Schweiz AG, Baden (CH)

(72) Inventors: Fabio Tombelli, Terranuova Bracciolini (IT); Pawel Blaszczyk, Wieliczka (PL); Marco Lega, Montevarchi (IT); Oscar Apeldoorn, Lengnau (CH)

(73) Assignee: ABB E-Mobility B.V., Delft (NL)

( * ) Notice: Subject to any disclaimer, the term of this patent is extended or adjusted under 35 U.S.C. 154(b) by 113 days.

(21) Appl. No.: 17/045,596

(22) PCT Filed: Apr. 6, 2018

(86) PCT No.: PCT/EP2018/058936
§ 371 (c)(1),
(2) Date: Oct. 6, 2020

(87) PCT Pub. No.: WO2019/192736
PCT Pub. Date: Oct. 10, 2019

(65) Prior Publication Data
US 2021/0023958 A1 Jan. 28, 2021

(51) Int. Cl.
*B60L 53/12* (2019.01)
*B60L 53/30* (2019.01)
(Continued)

(52) U.S. Cl.
CPC ............. *B60L 53/12* (2019.02); *B60L 53/305* (2019.02); *B60L 53/60* (2019.02); *B60L 53/66* (2019.02);
(Continued)

(58) Field of Classification Search
CPC ........ B60L 53/66; B60L 53/12; B60L 53/305; B60L 53/60; B60L 2210/30;
(Continued)

(56) References Cited

U.S. PATENT DOCUMENTS 9,184,633 B2    11/2015   Obayashi
9,437,362 B2 *   9/2016   Kim ........................ H02J 7/025
(Continued)

FOREIGN PATENT DOCUMENTS

CN    107618388 A    1/2018
CN    107750412 A    3/2018
(Continued)

OTHER PUBLICATIONS

European Patent Office, International Search Report & Written Opinion issued in corresponding Application No. PCT/EP2018/058936, dated Dec. 20, 2018, 17 pp.
(Continued)

*Primary Examiner* — Richard Isla
*Assistant Examiner* — Manuel Hernandez
(74) *Attorney, Agent, or Firm* — Armstrong Teasdale LLP

(57) ABSTRACT

A power transfer system for supplying electric power to a battery of an electric vehicle including a control architecture including control arrangements capable of controlling the transmission of electric power to a battery of the electric vehicle as a function of detected temperatures at the transmitter and receiver coils. In a further aspect, the application relates to a method for controlling a power transfer system.

13 Claims, 5 Drawing Sheets

Figure 1:
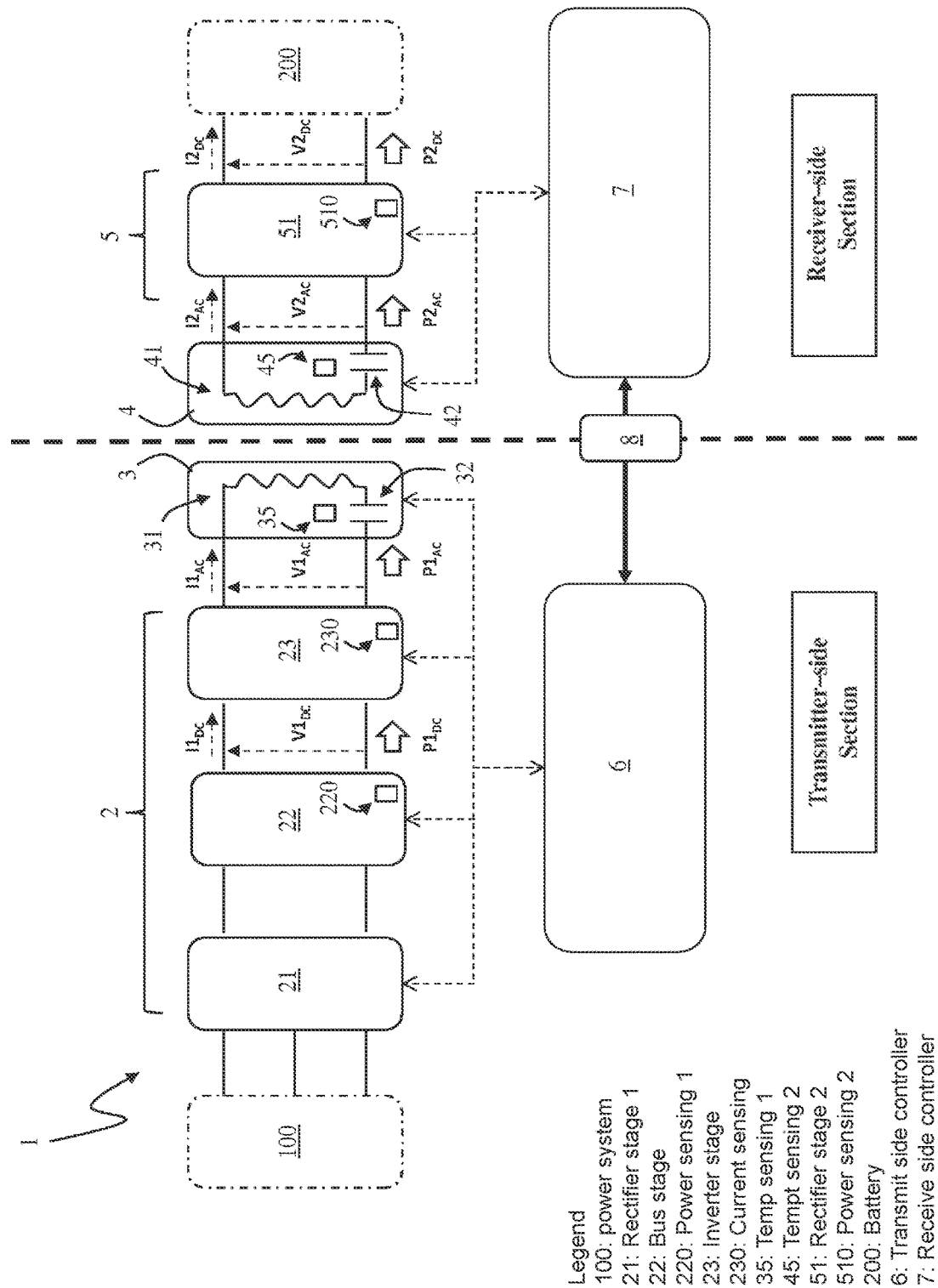
Figure 2:
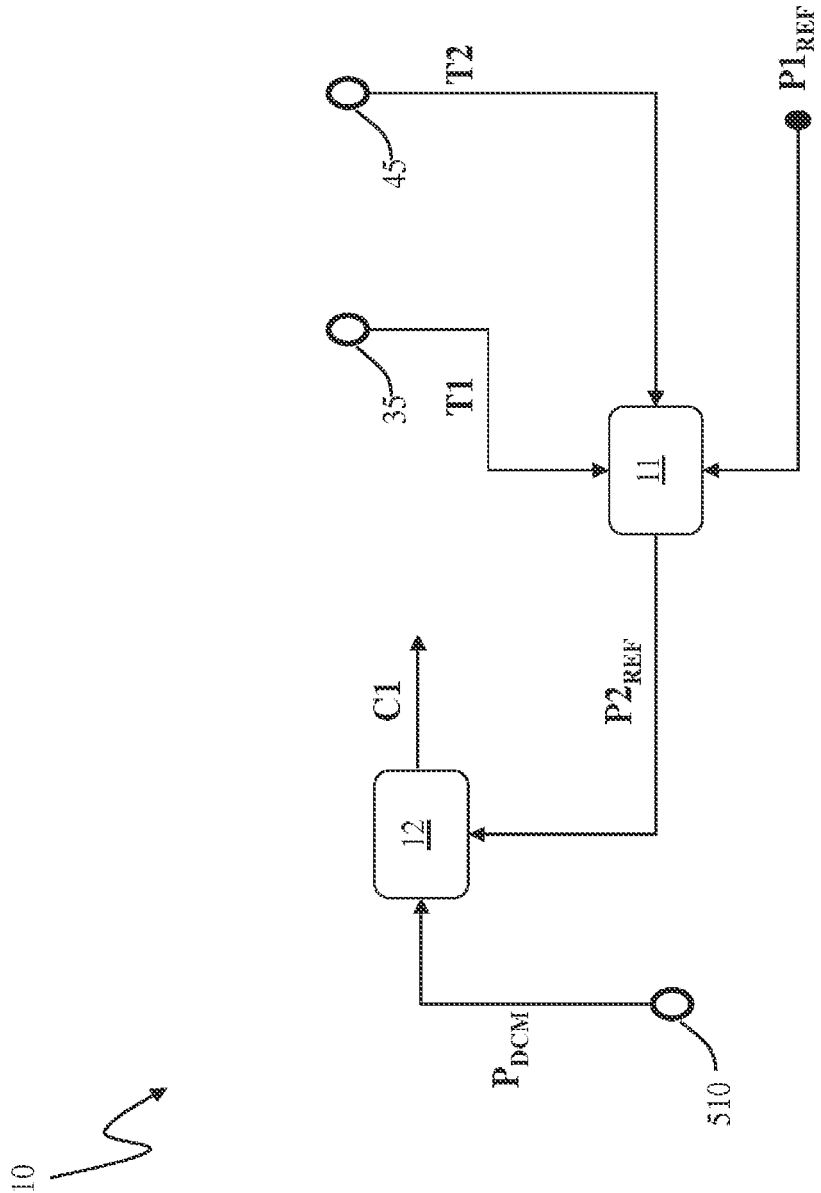
Figure 3:
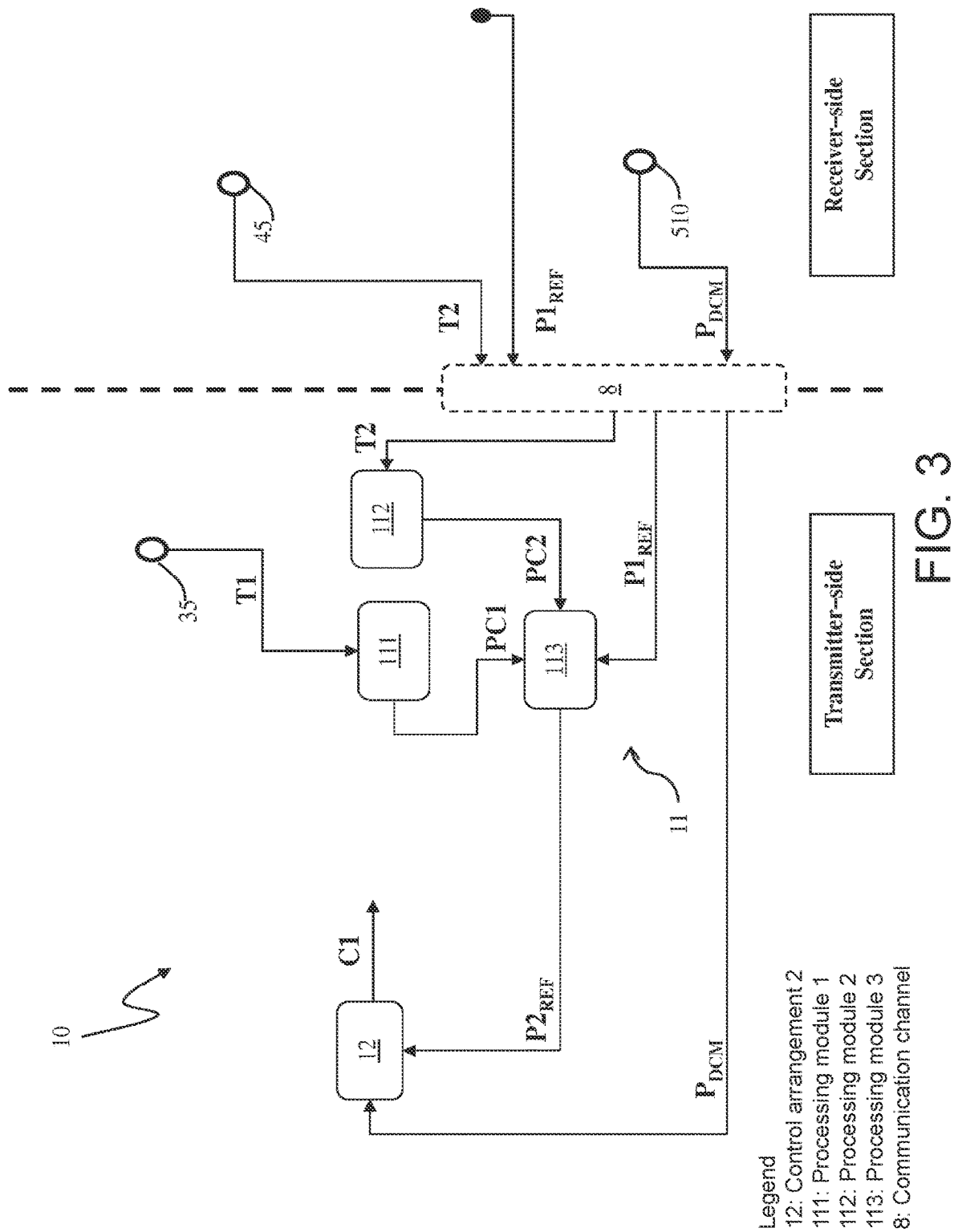
Figure 4:
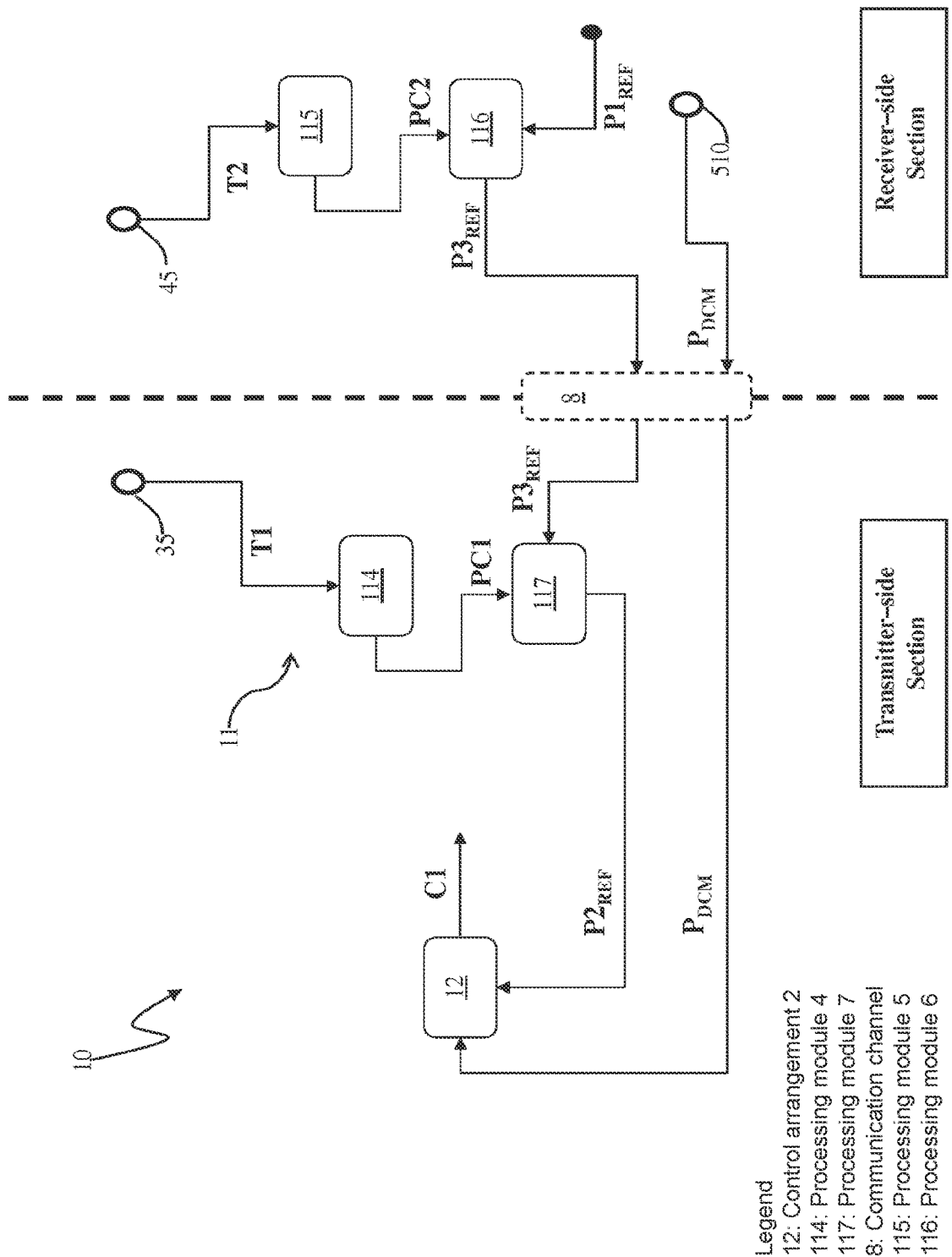
Figure 5:
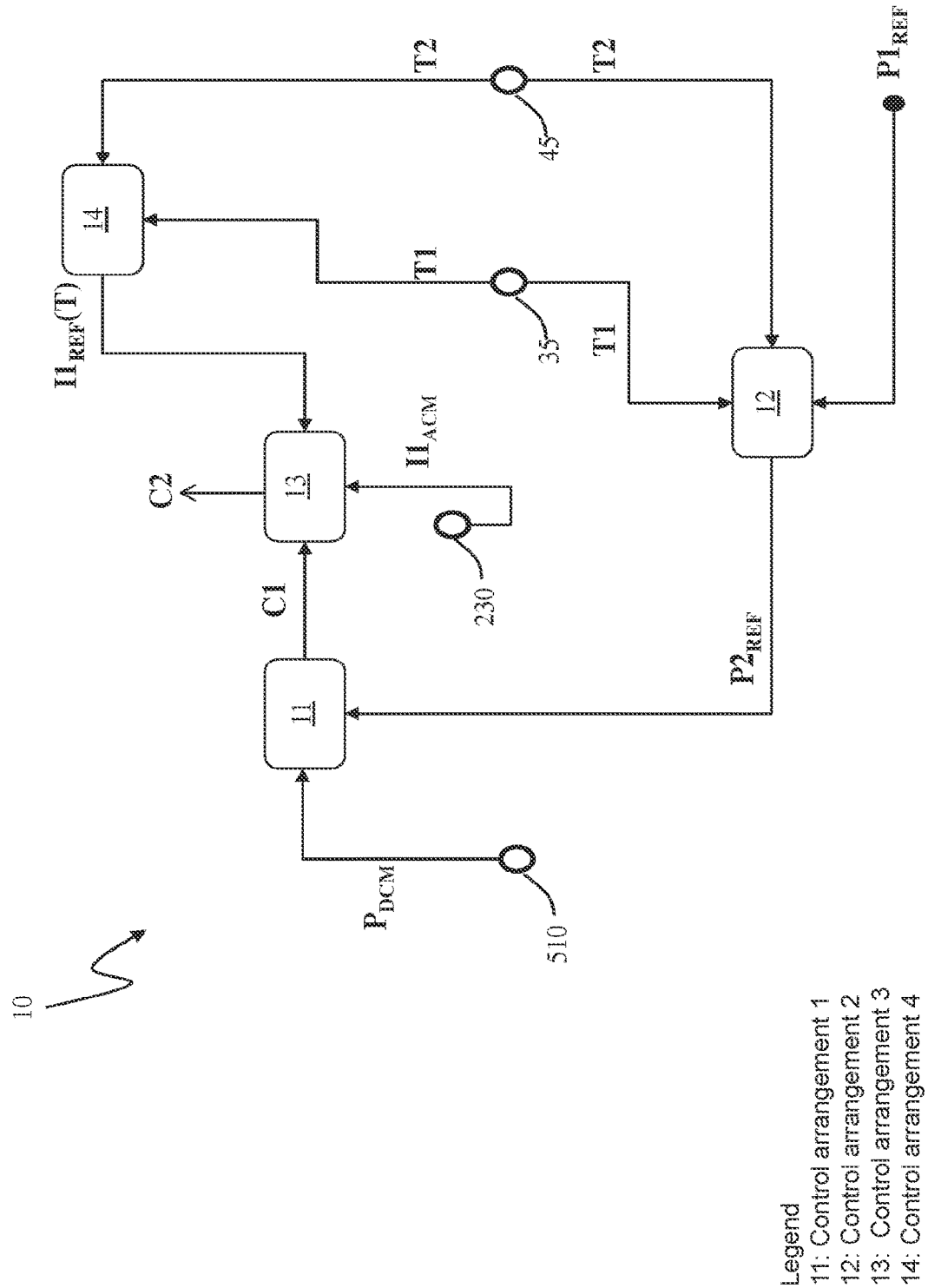

(51) Int. Cl.
*B60L 53/60* (2019.01)
*B60L 53/66* (2019.01)
*H02J 7/00* (2006.01)
*H02J 7/04* (2006.01)
*H02J 50/12* (2016.01)
*H02J 50/80* (2016.01)

(52) U.S. Cl.
CPC ...... *H02J 7/00032* (2020.01); *H02J 7/00034* (2020.01); *H02J 7/007192* (2020.01); *H02J 7/04* (2013.01); *H02J 50/12* (2016.02); *H02J 50/80* (2016.02); *B60L 2210/30* (2013.01); *B60L 2210/42* (2013.01); *H02J 2207/20* (2020.01); *H02J 2310/48* (2020.01)

(58) Field of Classification Search
CPC ............... B60L 2210/42; H02J 7/00032; H02J 7/00034; H02J 7/007192; H02J 7/04; H02J 50/12; H02J 50/80; H02J 2207/20; H02J 2310/48
USPC ............................................ 320/108; 307/104
See application file for complete search history.

(56) References Cited

U.S. PATENT DOCUMENTS

| | | | |
|---|---|---|---|
| 9,843,199 B2 | 12/2017 | Bosshard et al. | |
| 10,097,045 B2 | 10/2018 | Guidi | |
| 2004/0201361 A1 | 10/2004 | Koh | |
| 2009/0174263 A1 | 7/2009 | Baarman | |
| 2012/0286724 A1* | 11/2012 | Tsai | H02J 7/04 |
| | | | 320/108 |
| 2013/0026848 A1* | 1/2013 | Ito | B60L 53/37 |
| | | | 307/104 |
| 2013/0033228 A1 | 2/2013 | Raedy | |
| 2013/0063160 A1* | 3/2013 | Nakano | G01R 31/72 |
| | | | 324/653 |
| 2013/0119925 A1* | 5/2013 | Kawamura | H02J 50/90 |
| | | | 320/108 |
| 2013/0249480 A1* | 9/2013 | Paparo | H02J 7/025 |
| | | | 320/108 |
| 2014/0042967 A1 | 2/2014 | Herzog | |
| 2014/0159501 A1* | 6/2014 | Kanno | B60L 53/36 |
| | | | 307/104 |
| 2014/0340027 A1 | 11/2014 | Keeling et al. | |
| 2015/0214748 A1 | 7/2015 | Lin | |
| 2015/0280455 A1* | 10/2015 | Bosshard | B60L 53/122 |
| | | | 307/104 |
| 2015/0303714 A1* | 10/2015 | Keeling | H02J 50/40 |
| | | | 320/108 |
| 2015/0318900 A1* | 11/2015 | Shimokawa | H02J 5/005 |
| | | | 307/104 |
| 2017/0025903 A1* | 1/2017 | Song | H02J 50/40 |
| 2017/0267111 A1 | 9/2017 | Ochi | |
| 2017/0338685 A1 | 11/2017 | Jung et al. | |
| 2018/0241223 A1 | 8/2018 | Bae | |
| 2018/0342878 A1 | 11/2018 | Nagaoka | |
| 2018/0358843 A1 | 12/2018 | Misawa | |
| 2021/0162875 A1* | 6/2021 | Tombelli | B60L 53/122 |

FOREIGN PATENT DOCUMENTS

| | | |
|---|---|---|
| EP | 2530812 A1 | 12/2012 |
| KR | 20140031709 A | 3/2014 |
| WO | 2012005607 A2 | 1/2012 |
| WO | 2017026721 A1 | 2/2017 |

OTHER PUBLICATIONS

European Patent Office, International Search Report & Written Opinion issued in corresponding Application No. PCT/EP2018/058930, dated Dec. 20, 2018, 17 pp.
European Patent Office, International Search Report & Written Opinion issued in corresponding Application No. PCT/EP2018/060318, dated Dec. 20, 2018, 15 pp.

\* cited by examiner

INDUCTIVE POWER TRANSFER SYSTEM FOR DERATING A BATTERY CHARGING PROFILE OF ELECTRIC VEHICLE BATTERIES AND CONTROL METHOD THEREOF

The present invention relates to the field of power transfer systems for electric vehicles. In particular, the present invention regards an inductive power transfer system capable of exchanging electric power between an electric power system with a battery on board an electric vehicle, in a wireless manner.

Wireless inductive power transfer systems for electric vehicles are well known in the state of the art. Typically, these systems are used to charge the electric battery of an electric vehicle.

When used as battery charging systems, wireless inductive power transfer systems employ a transmitter coil, which is placed on or embedded in a ground surface, to inductively transmit electric power to a receiver coil mounted on board an electric vehicle through the air gap between the road surface and the vehicle itself.

As in traditional transformers, an AC current flowing in the winding of the transmitter coil produces a magnetic flux making an induced AC current to flow in the winding of the receiver coil. In this way, electric power may be inductively transferred from the transmitter coil to the receiver coil.

When used as battery charging systems, wireless power transfer systems for electric vehicles typically comprise a transmitter-side section, which normally includes the transmitter coil and a power supply system connectable to the mains to feed the transmitter coil, and a receiver-side section, which normally includes, on board the electric vehicle, the receiver coil and a power conversion system to feed the battery with electric power inductively received by the receiver coil.

Both the transmitter-side section and the receiver-side section of the power transfer system include a number of controllers to control their operation. Controllers arranged at different sections can mutually communicate through a dedicated communication channel, which is typically a wireless communication channel, e.g. of the Wi-Fi™ type.

In order to ensure a suitable charging process of the battery on board the electric vehicle, electric power transferred to the battery has to be properly controlled according to a battery charging profile that is typically set-up depending on the characteristics and state-of-charge of the battery and on other additional aspects, such as the reduction of the energy consumption during a charging cycle, the reduction of the time required for the charging process, and the like.

For this reason, the controllers of a wireless power transfer system for electric vehicles typically implement a control architecture configured to control the operation of the above-mentioned power supplying system as a function of the selected battery charging profile.

Control arrangements currently used in power transfer systems of the state of the art often show poor performances in terms of reliability, in particular when control functionalities to safely operate the transmitter coil and receiver coil are requested.

The main aim of the present invention is to provide a wireless power transfer system for electric vehicles, which allows overcoming the above-described disadvantages.

Within this aim, another object of the present invention is to provide a wireless power transfer system ensuring a suitable transmission of electric power to the battery on board a vehicle, in accordance with a given battery charging profile.

Another object of the present invention is to provide a wireless power transfer system ensuring good performances in terms of reliability, even when safety control functionalities of temperatures and currents and the transmitter coil and receiver coil are requested.

Another object of the present invention is to provide a wireless power transfer system relatively easy and inexpensive to arrange and produce at industrial level.

The above aim and objects, together with other objects that will be more apparent from the subsequent description and from the accompanying drawings, are achieved by a power transfer system for electric vehicles according to the following claim 1 and the related dependent claims.

In a general definition, the power transfer system, according to the invention, comprises:

a transmitter-side power sub-system comprising a first rectifying stage electrically coupleable with an electric power system (e.g. the mains), a DC-bus stage electrically coupled with said first rectifying stage and adapted to provide a first DC power and an inverter stage electrically coupled with said DC-bus stage and adapted to receive said first DC power and provide a first AC power;

a transmitter-side coil sub-system electrically coupled with said inverter stage and adapted to receive said first AC power. The transmitter-side coil sub-system comprises a transmitter coil adapted to receive a first AC current and a first temperature sensing arrangement configured to provide first temperature detection signals indicative of operating temperatures of said transmitter-side coil-subsystem;

one or more transmitter-side controllers adapted to control operation of said transmitter-side power sub-system and transmitter-side coil sub-system;

a receiver-side coil sub-system comprising a receiver coil inductively coupleable with said transmitter coil and a second temperature sensing arrangement configured to provide second temperature detection signals indicative of operating temperatures of said receiver-side coil-subsystem. The receiver-side coil sub-system is adapted to exchange an AC power with said transmitter-side coil sub-system;

a receiver-side power sub-system comprising a second rectifying stage electrically coupled with said receiver-side coil sub-system and adapted to exchange a second AC power ($P2_{AC}$) with said receiver-side coil sub-system. Said second rectifying stage is electrically coupleable with a battery and adapted to provide a second DC power to said battery;

one or more receiver-side controllers adapted to control operation of said receiver-side coil sub-system and receiver-side power sub-system. Said transmitter-side and receiver-side controllers are capable to mutually communicate through a wireless communication channel.

According to the invention, said transmitter-side and receiver-side controllers implement a control architecture adapted to control the second DC power received by said battery and adapted to provide temperature control functionalities of the operating temperatures at said transmitter-side coil sub-system and said receiver-side coil sub-system.

According to an aspect of the invention, said control architecture is adapted to receive and process at least one of said first and second temperature detection signals and a first power reference signal for said second DC power and to provide a second power reference signal for said second DC power. Said control architecture is configured to calculate said second power reference signal by correcting said first power reference signal basing on at least one of said first and second temperature detection signals.

According to an aspect of the invention, said control architecture is adapted to control the second DC power received by said battery. Said control architecture is configured to receive and process said second reference signal and provide a first control signal to control operation of at least one of said rectifying stage and said DC-bus stage.

According to an aspect of the invention, said control architecture is adapted to control a first AC current provided by said inverter stage. Said control architecture is configured to receive and process a current reference signal indicative of desired values for said first AC current and a current detection signal indicative of measured values of said first AC current and provide a second control signal to control operation of at least one of said rectifying stage and said first DC-bus stage. Said control architecture is configured to calculate said second control signal by correcting said first control signal basing on said current reference signal and said current detection signal.

According to an aspect of the invention, said control architecture is adapted to receive and process at least one of said first and second temperature detection signals and provide said current reference signal. Said control architecture is configured to select said current reference signal depending on the temperature values measured by said first and second sensing arrangements.

In a further aspect, the present invention related to a method for controlling a power transfer system according to the following claim 11 and the related dependent claims.

Said power transfer system comprises:
a transmitter-side power sub-system comprising a first rectifying stage electrically coupleable with an electric power system (e.g. the mains), a DC-bus stage electrically coupled with said first rectifying stage and adapted to provide a first DC power and an inverter stage electrically coupled with said DC-bus stage and adapted to receive said first DC power and provide a first AC power;
a transmitter-side coil sub-system electrically coupled with said inverter stage and adapted to receive said first AC power. The transmitter-side coil sub-system comprises a transmitter coil adapted to receive a first AC current and a first temperature sensing arrangement configured to provide first temperature detection signals indicative of operating temperatures of said transmitter-side coil-subsystem;
a receiver-side coil sub-system comprising a receiver coil inductively coupleable with said transmitter coil and a second temperature sensing arrangement configured to provide second temperature detection signals indicative of operating temperatures of said receiver-side coil-subsystem. The receiver-side coil sub-system is adapted to exchange an AC power with said transmitter-side coil sub-system;
a receiver-side power sub-system comprising a second rectifying stage electrically coupled with said receiver-side coil sub-system and adapted to exchange a second AC power with said receiver-side coil sub-system. Said second rectifying stage is electrically coupleable with a battery and adapted to provide a second DC power to said battery.

According to the invention, said method comprises controlling the second DC power received by said battery and providing temperature control functionalities of the operating temperatures at said transmitter-side coil sub-system and said receiver-side coil sub-system.

According to an aspect of the invention, said method comprises receiving and processing at least one of said first and second temperature detection signals and a first power reference signal for said second DC power to provide a second power reference signal for said second DC power. Said second power reference signal is calculated by correcting said first power reference signal basing on at least one of said first and second temperature detection signals.

According to an aspect of the invention, said method comprises controlling the second DC power received by said battery by receiving and processing said second reference signal and providing a first control signal to control operation of at least one of said rectifying stage and said DC-bus stage.

According to an aspect of the invention, said method comprises controlling a first AC current provided by said inverter stage by receiving and processing a current reference signal indicative of desired values for said first AC current and a current detection signal indicative of measured values of said first AC current and by providing a second control signal to control operation of at least one of said rectifying stage and said first DC-bus stage. Said second control signal is calculated by correcting said first control signal basing on said current reference signal and said current detection signal.

According to an aspect of the invention, said method comprises receiving a processing at least one of said first and second temperature detection signals and selecting said current reference signal depending on the temperature values measured by said first and second sensing arrangements.

Further characteristics and advantages of the present invention will be more apparent with reference to the description given below and to the accompanying figures, provided purely for explanatory and non-limiting purposes, wherein:

FIG. 1 schematically illustrates the power transfer system, according to the present invention;

FIGS. 2-5 schematically illustrate some control arrangements employed in the power transfer system, according to the present invention.

With reference to FIG. 1, the present invention refers to a power transfer system 1 for electric vehicles capable of exchanging electric power between an electric power system 100 (e.g. the mains) and a battery 200 on board an electric vehicle, in a wireless manner.

The power transfer system 1 is particularly adapted to be used as a battery charging system capable of transferring electric power harvested from the electric power system 100 to the battery 200 on board an electric vehicle and it will be described with specific reference to this application for the sake of simplicity.

However, the power transfer system 1 may be suitable to implement bidirectional power transfer functionalities and therefore it may be employed to transfer electric power from the battery 200 to the electric power system 100.

The power transfer system 1 comprises a transmitter-side section and a receiver-side section, which respectively include a number of power sub-systems and components arranged off-board and on-board the electric vehicle.

At the transmitter-side section, the power transfer system 1 comprises a transmitter-side power sub-system 2 electrically coupleable with the electric power system 100.

The transmitter-side power sub-system 2 comprises a first AC/DC rectifying stage 21 electrically coupleable with the electric power system 100 and adapted to receive AC electric power from the power system 100 and to provide DC electric power.

Preferably, the first rectifying stage 21 includes a filter and a switching converter electrically coupled in cascade (not shown) to provide a suitable filtering and rectification of the currents and voltages received from the electric power system 100.

Preferably, the first rectifying stage 21 includes power switches controllable by means of a suitable control signal.

The transmitter-side power sub-system 2 further comprises a DC-bus stage 22 electrically coupled with the first rectifying stage 21 to be powered by this latter.

Conveniently, the DC-bus stage 22 is adapted to transmit DC electric power received from the first rectifying stage 21 and to provide a first DC power $P1_{DC}$, more particularly a first DC current $I1_{DC}$ and a first DC voltage $V1_{DC}$.

In some embodiments of the invention, the bus-stage 22 may comprise a capacitive circuit (e.g. a so-called DC-link circuit) to suitably store and make available the electric energy received from the rectifying stage 21. In this case, the amplitude of the first DC current $I1_{DC}$ and the first DC voltage $V1_{DC}$ (and therefore the first DC power $P1_{DC}$) provided by the DC bus-stage 22 may be controlled by suitably tuning the duty-cycle of the power switches of the first rectifying stage 21.

In alternative embodiments, the bus-stage 22 may include a DC-DC switching converter (e.g. a buck switching converter) that conveniently includes power switches controllable by means of a suitable control signal. In this case, the amplitude of the first DC current $I1_{DC}$ and the first DC voltage $V1_{DC}$ (and therefore the first DC power $P1_{DC}$) provided by the DC-bus stage 22 may be controlled by suitably tuning the duty-cycle of the power switches of the said DC-DC switching converter.

Preferably, the DC-bus stage 22 comprises a first power sensing arrangement 220 adapted to detect the first DC current $I1_{DC}$ and the first DC voltage $V1_{DC}$ and to provide power detection signals indicative of the first DC power $P1_{DC}$.

The transmitter-side power sub-system 2 further comprises a DC/AC inverter stage 23 electrically coupled with the first DC-bus stage 22.

The inverter stage 23 is adapted to receive the first DC power $P1_{DC}$, more particularly the first DC current $I1_{DC}$ and the first DC voltage $V1_{DC}$, which are provided by the DC-bus stage 22, and provide a first AC power $P1_{AC}$, more particularly a first AC current $I1_{AC}$ and a first AC voltage $V1_{AC}$.

Preferably, the inverter stage 23 comprises a DC/AC switching converter including power switches controllable by means of a suitable control signal. In this way, the frequency of the first AC current $I1_{AC}$ and of the first AC voltage $V1_{AC}$ provided by the inverter stage 23 may be controlled by suitably tuning the frequency of the power switches of such an electronic stage.

Preferably, the inverter stage 23 comprises a current sensing arrangement 230 adapted to detect the first AC current $I1_{AC}$ and provide current detection signals $I1_{ACM}$ indicative of said current.

At the transmitter-side section, the power transfer system 1 comprises a transmitter-side coil sub-system 3 electrically coupled with the inverter stage 23 and adapted to receive a first AC power $P1_{AC}$, more particularly a first AC current $I1_{AC}$ and a first AC voltage $V1_{AC}$, which are provided by the inverter stage 23.

The transmitter-side coil sub-system 3 comprises a transmitter coil 31 adapted to receive the first AC current $I1_{AC}$ provided by the inverter stage 23.

Preferably, the transmitter-side coil sub-system 3 comprises a first resonant capacitor 32 electrically coupled (e.g. in series as shown in FIG. 1) with the transmitter coil 31.

The transmitter-side coil sub-system 3 comprises a first temperature sensing arrangement 35 configured to provide first temperature detection signals T1 indicative of operating temperatures of said transmitter-side coil-subsystem.

As an example, the first temperature sensing arrangement 35 may include a plurality of temperatures sensors (e.g. NTC sensors) arranged to detect the operating temperatures of the transmitter coil 31, the first resonant capacitor 32 and other components of the transmitter-side coil-subsystem 3.

Preferably, the transmitter-side coil sub-system 3 comprises auxiliary circuits (not shown) operatively associated with the first temperature sensing arrangement 35, e.g. interface electronic circuits and the like.

At the transmitter-side section, the power transfer system 1 comprises one or more transmitter-side controllers (collectively indicated by the reference number 6) to control the operation of the transmitter-side power sub-system 2 and the transmitter-side coil sub-system 3. As an example, the transmitter-side controllers 6 may include a controller to control the operation of the rectifying stage 21, a controller to control the operation of the bus stage 22 (when including a DC-Dc switching converter), a controller to control the operation of the inverter stage 23 and a controller to control the operation of the first temperature sensing arrangement 35 and possible auxiliary circuits included in the transmitter-side coil sub-system 3.

In a preferred practical implementation of the invention, the transmitter-side power sub-system 2 is arranged in a wall-box device for an electric vehicle charging facility, e.g. for residential purposes. Such a wall-box device may conveniently include the transmitter-side controllers 6 operatively associated with the electronic stages of the transmitter-side power sub-system 2. The transmitter-side coil sub-system 3 is instead arranged or embedded in a ground pad device for an electric vehicle charging facility, e.g. for residential purposes. Such a ground pad device may conveniently include possible transmitter-side controllers 6 operatively associated to transmitter-side coil sub-system 3.

At the receiver-side section, the power transfer system 1 comprises a receiver-side coil sub-system 4 comprising a receiver coil 41 inductively coupleable with the transmitter coil 31.

When the transmitter coil 31 and the receiver coil 41 are inductively coupled (obviously with an air gap in therebetween), a first AC current $I1_{AC}$ flowing along the transmitter coil 31 produces a magnetic flux making an induced second AC current $I2_{AC}$ to flow along the receiver coil 41. In this way, electric power may be inductively exchanged between the transmitter coil 31 and the receiver coil 41.

The receiver-side coil sub-system 4 is thus adapted to exchange an AC power with the transmitter-side coil sub-system 3.

Due to magnetic coupling losses, electric power is exchanged between the transmitter coil 31 and the receiver coil 41 with efficiency values $\eta<1$.

A second AC power $P2_{AC}$ at the receiver-side coil sub-system 4 may thus be lower than the first AC power $P1_{AC}$ at the transmitter-side coil sub-system 3.

Preferably, the receiver-side coil sub-system 4 comprises a second resonant capacitor 42 electrically coupled (e.g. in series as shown in FIG. 1) with the receiver coil 41.

Preferably, resonant capacitors 32, 42 are designed to form a resonant RLC circuit together with the inductance of transmitter coils 31, 41 and the equivalent impedance seen at the output terminals of the receiver-side coil sub-system 4. In this way, by operating the inverter stage 23 so that the first AC current $I1_{AC}$ flowing along the transmitter coil 31 has a fundamental frequency close or corresponding to the resonant frequency of such a resonant circuit, electric power may be exchanged between the transmitter-side coil sub-system 3 and the receiver-side coil sub-system 4 with high efficiency values despite of the necessarily large air gap between the transmitter coil 31 and the receiver coil 41. Additionally, the amplitude of the first AC current $I1_{AC}$ flowing along the transmitter coil 31 can be reduced or minimized due to nearly-zero phase shift between said current and the first AC voltage $V1_{AC}$.

The receiver-side coil sub-system 4 comprises a second temperature sensing arrangement 45 configured to provide second temperature detection signals T2 indicative of operating temperatures of said receiver-side coil-subsystem. As an example, the second temperature sensing arrangement 45 may include a plurality of temperatures sensors (e.g. NTC sensors) arranged to detect the operating temperatures of the receiver coil 41, the second resonant capacitor 42 and other components of the transmitter-side coil-subsystem 3.

Preferably, the receiver-side coil sub-system 4 comprises auxiliary circuits (not shown) operatively associated with the second temperature sensing arrangement 45, e.g. interface electronic circuits and the like.

At the receiver-side section, the power transfer system 1 comprises a receiver-side power sub-system 5 comprising a second rectifying stage 51 electrically coupled with the receiver-side coil sub-system 4 and adapted to exchange the second AC power $P2_{AC}$ with the receiver-side coil sub-system 4, more particularly to receive a second AC current $I2_{AC}$ and a second AC voltage $V2_{AC}$.

Preferably, the second rectifying stage 51 includes a full-wave diode bridge electrically coupled in cascade with a filter (not shown) to provide a suitable rectification and filtering of the second AC current $I2_{AC}$ and second AC voltage $V2_{AC}$ received from the receiver-side coil sub-system 4.

As an alternative embodiment, the second rectifying stage 51 may include a switching converter and a filter (not shown) electrically coupled in cascade to provide a suitable rectification and filtering of the currents and voltages received from the receiver-side coil sub-system 4. In this case, the second rectifying stage 51 may include power switches controllable by means of a suitable control signal.

The second rectifying stage 51 is electrically coupleable with the battery 200 and is adapted to provide a second DC power $P2_{DC}$ to said battery, more particularly a second DC current $I2_{DC}$ and a second DC voltage $V2_{DC}$.

Preferably, the second rectifying stage 51 comprises a second power sensing arrangement 510 adapted to detect the second DC current $I2_{DC}$ and the second DC voltage $V2_{DC}$ and provide power detection signals indicative of second DC power $P2_{DC}$ received by the battery 200.

At the receiver-side section, the power transfer system 1 comprises one or more receiver-side controllers (collectively indicated by the reference number 7) to control operation of the receiver-side power sub-system 5 and of the receiver-side coil sub-system 4. As an example, receiver-side controllers 7 may include a controller to control the operation of the rectifying stage 51 and a controller to control the operation of the second temperature sensing arrangement 45 and the auxiliary circuits included in the receiver-side coil sub-system 4.

According to the invention, the power transfer system 1 comprises at least a wireless communication channel 8, through which the transmitter-side and receiver-side controllers 6, 7 are capable to mutually communicate. As an example, a Wi-Fi™ communication protocol may be adopted for the communication channel 8.

In a preferred practical implementation of the invention, the receiver-side coil sub-system 4, the receiver-side power sub-system 5 and the receiver-side controllers 7 are arranged (together with the battery 200) on board an electric vehicle.

According to the invention, the transmitter-side and receiver-side controllers 6, 7 implement a control architecture 10 to control the second DC power $P2_{DC}$ received by the battery 200 and, at the same time, to provide temperature control functionalities of the operating temperatures at the transmitter-side coil sub-system 3 and the receiver-side coil sub-system 4.

More particularly, the transmitter-side and receiver-side controllers 6, 7 implement a control architecture 10 including control arrangements capable of suitably controlling the transmission of electric power to the battery 200 as a function of the operating temperatures measured by the first and second temperature sensing arrangements 35, 45.

According to the invention, the control architecture 10 comprise a first control arrangement 11 configured to receive and process at least one of the first and second temperature detection signals T1, T2, which are provided by the first and second temperature sensing arrangements 35, 45, and a first power reference signal $P1_{REF}$ for the second DC power $P2_{DC}$.

Conveniently, the first power reference signal $P1_{REF}$ may be a reference signal indicative of reference values for the second DC power $P2_{DC}$, which is calculated basing on a selected battery charging profile for the battery 200. As an alternative, the first signal $P1_{REF}$ may be a signal indicating to increase or decrease the second DC power $P2_{DC}$ received by the battery 200.

The first control arrangement 11 is configured to provide a second power reference signal $P2_{REF}$ for the second DC power $P2_{DC}$.

Conveniently, the second power reference signal $P2_{REF}$ is calculated by correcting the first power reference signal $P1_{REF}$ basing on at least one of the first and second temperature detection signals T1, T2.

Conveniently, the second power reference signal $P2_{REF}$ may be a reference signal indicative of reference values for the second DC power $P2_{DC}$. As an alternative, the second power reference signal $P2_{REF}$ may be a signal indicating to increase or decrease the second DC power $P2_{DC}$ received by the battery 200.

According to the invention, the control architecture 10 comprises a second control arrangement 12 adapted to control the second DC power $P2_{DC}$ received by the battery 200.

The second control arrangement 12 is configured to receive and process the second reference signal $P2_{REF}$ and provide a first control signal C1 to control operation of at least one of the rectifying stage 21 and the DC-bus stage 22.

The control architecture 10 advantageously allows controlling the electric power provided to the battery 200 by taking into consideration the operating temperatures detected by the first and second temperature sensing arrangements 35, 45 at the transmitter-side and receiver-side coil sub-systems 3, 4.

Preferably, if the operating temperatures detected at the transmitter-side coil sub-system 3 and/or the receiver-side coil sub-systems 4 exceed given threshold values, the first control arrangement 11 calculates the second power reference signal $P2_{REF}$ for the second control arrangement 12 by suitable reducing the reference values for the second DC power $P2_{DC}$ provided by the first power reference signal $P1_{REF}$, which are initially set-up basing on the battery charging profile selected for the battery 200.

In practice, if the operating temperatures detected at the transmitter-side coil sub-system 3 and/or the receiver-side coil sub-systems 4 exceed given threshold values, the first control arrangement 11 calculates the second power reference signal $P2_{REF}$ by operating a derating correction of the first power reference signal $P1_{REF}$.

In this way, the electric power provided to the battery 200 may be temporarily reduced in order to ensure that operating temperatures at the transmitter-side and receiver-side coil sub-systems 3, 4 do not exceeds safety threshold values.

Preferably, if the operating temperatures detected at the transmitter-side coil sub-system 3 and/or the receiver-side coil sub-systems 4 do not exceed given threshold values, the first control arrangement 11 calculates the second power reference signal $P2_{REF}$ for the second control arrangement 12 without reducing the reference values for the second DC power $P2_{DC}$ provided by the first power reference signal $P1_{REF}$. In this case, the second power reference signal $P2_{REF}$ substantially coincides with the first power reference signal $P1_{REF}$.

In practice, if the operating temperatures detected at the transmitter-side coil sub-system 3 and/or the receiver-side coil sub-systems 4 do not exceed given threshold values, the first control arrangement 11 calculates the second power reference signal $P2_{REF}$ without operating a derating correction of the first power reference signal $P1_{REF}$.

In this way, the electric power provided to the battery 200 may be regulated according to the selected battery charging profile.

The first control arrangement 11 may be arranged in practice according various configurations and comprise a number of control modules that are conveniently implemented by executable sets of software instructions stored by the transmitter-side controllers 6 and/or the receiver-side controllers 7.

According to an embodiment of the invention, the first control arrangement 11 is implemented at level of the transmitter-side controllers 6. In this case, the transmitter-side controllers 6 may be conveniently adapted to receive the first power reference signal $P1_{REF}$ and the second temperature detection signals T2, provided by the second temperature sensing arrangement 45, from said the receiver-side controllers 7 through the wireless communication channel 8.

According to this embodiment of the invention (FIG. 3), the first control arrangement 11 comprises a first processing module 111, which is configured to receive and process the first temperature detection signals T1 and provide a first power correction signal PC1, and a second processing module 112 configured to receive and process the second temperature detection signals T2 and provide a second power correction signal PC2.

Conveniently, the first and second power correction signals PC1, PC2 are used to correct a first power reference signal $P1_{REF}$ and calculate a second power reference signal $P2_{REF}$ to be provided to the second control arrangement 12.

To this aim, the first control arrangement 11 comprises a third processing module 113 configured to receive and process the first and second power correction signals PC1, PC2 and the first power reference signal $P1_{REF}$ and provide the second power reference signal $P2_{REF}$ for the second control arrangement 12.

According to this embodiment of the invention, the control modules 111-113 are conveniently implemented by executable sets of software instructions stored by the transmitter-side controllers 6. In this case, the receiver-side controllers 7 may be simply adapted to carry out the task of transmitting the first power reference signal $P1_{REF}$ and the second temperature detection signals T2 to the transmitter-side controllers 6.

According to another embodiment of the invention (FIG. 4), the first control arrangement 11 is partially implemented at level of the transmitter-side controllers 6.

In this case, the transmitter-side controllers 6 may be conveniently adapted to receive a third power reference signal $P3_{REF}$ from said the receiver-side controllers 7 through the wireless communication channel 8. Conveniently, the third power reference signal $P3_{REF}$ is calculated by correcting the first power reference signal $P1_{REF}$ basing on the second temperature detection signals T2.

According to this embodiment of the invention, the first control arrangement 11 comprises a fourth processing module 114, which is configured to receive and process the first temperature detection signals T1 and provide a first power correction signal PC1, and a fifth processing module 115 configured to receive and process the second temperature detection signals T2 and provide the second power correction signal PC2.

Conveniently, the second power correction signals PC2 is used to correct the first power reference signal $P1_{REF}$ and calculate the third power reference signal $P3_{REF}$ to be transmitted through the wireless communication channel 8.

To this aim, the first control arrangement 11 comprises a sixth processing module 116 configured to receive and process the second power correction signal PC2 and the first power reference signal $P1_{REF}$ and provide the third power reference signal $P3_{REF}$.

Conveniently, the first power correction signals PC is used to correct the third power reference signal $P3_{REF}$ and calculate the second power reference signal $P2_{REF}$ to be provided to the second control arrangement 12.

To this aim, the first control arrangement 11 comprises a seventh processing module 117 configured to receive and process the first power correction signal PC1 and the third power reference signal $P3_{REF}$ and provide the second power reference signal $P2_{REF}$.

According to this embodiment of the invention, the control modules 114 and 117 are conveniently implemented by executable sets of software instructions stored by the transmitter-side controllers 6 whereas the control modules 115 and 116 are conveniently implemented by executable sets of software instructions stored by the transmitter-side controllers 6.

In principle, the second control arrangement 12 may have any suitable configuration adapted to control the second DC power $P2_{DC}$ received by the battery 200 by controlling the operation of at least one of the rectifying stage 21 and the DC-bus stage 22.

According to some embodiments of the invention (not shown), the second control arrangement 12 may have an open-loop control configuration.

According to preferred embodiments of the invention (FIGS. 1-5), however, the second control arrangement 12 has a closed-loop control configuration to control the second DC power $P2_{DC}$ received by the battery 200 by suitably controlling the amplitude of the voltages and currents provided by at least one of the rectifying stage 21 and the DC-bus stage 22.

In this case, the second control arrangement 12 is conveniently configured to receive and process the second power reference signal $P2_{REF}$, which is provided by the first control arrangement 11, a power detection signal $P_{DCM}$ indicative of measured values of the second DC power $P2_{DC}$ and provide the first control signal C1 to control operation of at least one of the rectifying stage 21 and the DC-bus stage 22.

Conveniently, the power detection signal $P_{DCM}$ is provided by the power sensing arrangement 510 included in the second rectifying stage 51.

Conveniently, the second control arrangement 12 may be configured to process also additional power detection signals (for example those provides by the first power sensing arrangement 220) to provide the first control signal C1.

According to these embodiments of the invention, the second control arrangement 12 is preferably implemented at level of the transmitter-side controllers 6. In this case, the second control arrangement 12 may include a number of control modules conveniently implemented by a number of executable sets of software instructions stored by the transmitter-side controllers 6. Additionally, the transmitter-side controllers 6 are adapted to receive the power detection signal $P_{DCM}$ from the receiver-side controllers 7 through the wireless communication channel 8.

According to alternative embodiments (not shown), the second control arrangement 12 may be partially implemented at level of the receiver-side controllers 7. In this case, the second control arrangement 12 may include a number of control modules conveniently implemented by a number of executable sets of software instructions stored by the transmitter-side controllers 6 and the receiver-side controllers 7. Additionally, suitable signals may be transmitted by the receiver-side controllers 7 to the transmitter-side controllers 6 to implement the second control arrangement 12.

According to preferred embodiments of the invention (FIG. 5), the control architecture 10 comprises a third control arrangement 13 to control the first AC current $I1_{AC}$ provided by the inverter stage 23.

The third control arrangement 13 is configured to receive and process a current reference signal $I1_{REF}$ indicative of desired values (e.g. threshold values) for the first AC current $I1_{AC}$ and a current detection signal $I1_{ACM}$ indicative of measured values of the first AC current $I1_{AC}$.

Conveniently, the current reference signal $I1_{REF}$ may be a reference signal indicative of reference values for the first AC current $I1_{AC}$. As an alternative, the current reference signal $I1_{REF}$ may be a signal indicating to increase or decrease the first AC current $I1_{AC}$.

The third control arrangement 13 is configured to provide a second control signal C2 to control operation of at least one of the said rectifying stage 21 and the first DC-bus stage 22, which is preferably calculated by correcting the first control signal C1, which is provided by the second control arrangement 12, basing on the current reference signal $I1_{REF}$ and on the current detection signal $I1_{ACM}$.

As it is evident from the above, the third control arrangement 13 forms a third closed-loop control arrangement capable of controlling the first AC current $I1_{AC}$ provided by the inverter stage 23 by suitably controlling the amplitude of the voltages and currents provided by at least one of the rectifying stage 21 and the DC-bus stage 22.

Preferably, the third control arrangement 13 intervenes if the first AC current $I1_{AC}$ provided by the inverter stage 23 exceeds threshold values provided by the current reference signal $I1_{REF}$. In this case, the third control arrangement 13 provides the second control signal C2 that is conveniently obtained by correcting the control signal C1 provided by the first control arrangement 11.

Preferably, the third control arrangement 13 does not intervene to correct the control signal C1 to control the rectifying stage 21 or the DC-bus stage 22, if the first AC current $I1_{AC}$ provided by the inverter stage 23 does not exceed the threshold values provided by the current reference signal $I1_{REF}$. In this case, the third control arrangement 13 provides a second control signal C2 that basically coincides with the control signal C1 provided by the first control arrangement 11.

Preferably, the third control arrangement 13 is implemented at level of the transmitter-side controllers 6. In this case, it may comprise a number of control modules conveniently implemented by executable sets of software instructions stored by the transmitter-side controllers 6.

An important aspect of the above-described embodiments of the invention consists in that the current reference signal $I1_{REF}$ received and processed by the third control arrangement 13 is advantageously selected depending on the temperatures measured by the first and second temperature sensing arrangements 35, 45.

To this aim, the control architecture 10 preferably comprises a fourth control arrangement 14 configured to receive and process at least one of the first and second temperature detection signals T1 and T2 and provide the current reference signal $I1_{REF}$ for the third control arrangement 13, which is selected depending on the temperature values measured by at least one of the first and second temperature sensing arrangements 35, 45.

As an example, the fourth control arrangement 14 may be configured to select the current reference signal $I1_{REF}$ from a predefined table (stored in a memory) basing on the temperature values provided by the first and second temperature detection signals T1 and T2.

Preferably, the fourth control arrangement 14 is implemented at level of the transmitter-side controllers 6. In this case, it may comprise a number of control modules conveniently implemented by executable sets of software instructions stored by the transmitter-side controllers 6. Additionally, the transmitter-side controllers 6 may be conveniently adapted to receive the second temperature detection signals T2, provided by the second temperature sensing arrangement 45, from said the receiver-side controllers 7 through the wireless communication channel 8.

The above-described embodiments of the invention are quite advantageous as they provide additional safety control functionalities particularly useful in critical operative conditions, in which the derating of the electric power to be provided to the battery 200, which is carried out by the first control arrangement 11, is not sufficient or effective to prevent that the operating temperatures at the transmitter-side and receiver-side coil sub-systems 3, 4 exceed given safety threshold values. As an example, these critical conditions may occur when the transmitter coil 31 is very misaligned with the receiver coil 41 due to a wrong positioning of the electric vehicle.

In a further aspect, the present invention relates to a control method for controlling operation of a power transfer system 1 as described above.

According to the invention, the method comprises controlling the second DC power $P2_{DC}$ received by the battery

200 and providing temperature control functionalities of the operating temperatures at the transmitter-side coil sub-system 3 and the receiver-side coil sub-system 4.

Preferably, the method, according to the invention comprises:
receiving and processing the first and second temperature detection signals T1, T2 and a first power reference signal $P1_{REF}$ for the second DC power $P2_{DC}$ received by the battery 200 to provide a second power reference signal $P2_{REF}$ for the second DC power $P2_{DC}$ received by the battery 200, said second power reference signal being calculated by correcting the first power reference signal $P1_{REF}$ basing on said the and second temperature detection signals T1, T2;
controlling the second DC power $P2_{DC}$ received by the battery 200 by receiving and processing the second reference signal $P2_{REF}$ and by providing a first control signal C1 to control operation of at least one of the rectifying stage 21 and the DC-bus stage 22.

Preferably, the method according to the invention comprises controlling the first AC current $I1_{AC}$ provided by the inverter stage 23 by receiving and processing a current reference signal $I1_{REF}$ indicative of desired values for the first AC current $I1_{AC}$ and a current detection signal $I1_{ACM}$ indicative of measured values of the first AC current $I1_{AC}$ and by providing a second control signal C2 to control operation of at least one of the rectifying stage 21 and the first DC-bus stage 22, said second control signal C2 being calculated by correcting the first control signal C1 basing on the current reference signal $I1_{REF}$ and the current detection signal $I1_{ACM}$.

Preferably, the method according to the invention comprises receiving and processing the first and second temperature detection signals T1, T2 to select the current reference signal $I1_{REF}$ depending on the temperature values measured by the first and second sensing arrangements 35, 45.

The power transfer system, according to the invention, allows achieving the intended aims and objects.

The power transfer system, according to the invention, includes a control architecture ensuring a suitable transmission of electric power to the battery on board a vehicle, in accordance with a given battery charging profile, and, at the same time, ensuring safety control functionalities to maintain the operating temperatures at the transmitter-side and receiver-side coil sub-systems 3, 4 do not exceed safety values.

Thanks to its innovative control architecture, the power transfer system, according to the invention, ensures good performances in terms of reliability, even when safety control functionalities are requested to be implemented.

The power transfer system, according to the invention, can be easily arranged and produced at industrial level, at competitive costs with respect to similar systems of the state of the art.

The invention claimed is:

1. A power transfer system for exchanging electric power between an electric power system and a battery of an electric vehicle comprising:
a transmitter-side power sub-system comprising a first rectifying stage electrically coupleable with said electric power system, a DC-bus stage electrically coupled with said first rectifying stage and adapted to provide a first DC power and an inverter stage electrically coupled with said DC-bus stage and adapted to receive said first DC power and provide a first AC power;
a transmitter-side coil sub-system electrically coupled with said inverter stage and adapted to receive said first AC power, said transmitter-side coil sub-system comprising a transmitter coil adapted to receive a first AC current and a first temperature sensing arrangement configured to provide first temperature detection signals indicative of operating temperatures of said transmitter-side coil sub-system;
one or more transmitter-side controllers adapted to control operation of said transmitter-side power sub-system and transmitter-side coil sub-system;
a receiver-side coil sub-system comprising a receiver coil inductively coupleable with said transmitter coil and a second temperature sensing arrangement configured to provide second temperature detection signals indicative of operating temperatures of said receiver-side coil sub-system, said receiver-side coil sub-system being adapted to exchange an AC power with said transmitter-side coil sub-system;
a receiver-side power sub-system comprising a second rectifying stage electrically coupled with said receiver-side coil sub-system and adapted to exchange a second AC power with said receiver-side coil sub-system, said second rectifying stage being electrically coupleable with said battery and adapted to provide a second DC power to said battery; and
one or more receiver-side controllers adapted to control operation of said receiver-side coil sub-system and receiver-side power sub-system, said transmitter-side and receiver-side controllers adapted to mutually communicate through a wireless communication channel,
wherein said transmitter-side and receiver-side controllers implement a control architecture including control arrangements adapted to control said second DC power received by said battery as a function of the operating temperatures measured by said first and second temperature sensing arrangements,
wherein said control architecture comprises:
a first control arrangement adapted to:
receive and process at least one of said first and second temperature detection signals and a first power reference signal for said second DC power;
provide a second power reference signal for said second DC power; and
calculate said second power reference signal by correcting said first power reference signal based on at least one of said first and second temperature detection signals; and
a second control arrangement adapted, to control said second DC power received by said battery, to:
receive said second reference power signal from said first control arrangement and
process said second power reference signal and provide a first control signal to control operation of said first rectifying stage and said DC-Bus stage, thereby controlling said second DC power received by said battery.

2. The power transfer system, according to claim 1, wherein said first control arrangement is implemented at a level of said one or more transmitter-side controllers, said transmitter-side controllers adapted to receive said first power reference signal and said second temperature detection signals from said one or more receiver-side controllers through said wireless communication channel.

3. The power transfer system, according to claim 2, wherein said transmitter-side power sub-system and one or more transmitter-side controllers are arranged in a wall-box device for an electric vehicle charging facility.

4. The power transfer system, according to claim 2, wherein said transmitter-side coil sub-system and one or more transmitter-side controllers are arranged or embedded in a ground pad device for an electric vehicle charging facility.

5. The power transfer system, according to claim 2, wherein said receiver-side coil sub-system, said receiver-side power sub-system, said one or more receiver-side controllers, and said battery are arranged on board said electric vehicle.

6. The power transfer system, according to claim 1, wherein said first control arrangement is implemented at a level of said one or more transmitter-side controllers and at a level of said one or more receiver-side controllers, said transmitter-side controllers being adapted to receive a third power reference signal from said one or more receiver-side controllers through said wireless communication channel, said third power reference signal calculated by correcting said first power reference signal based on said second temperature detection signals.

7. The power transfer system, according to claim 1, wherein said control architecture further comprises a third control arrangement adapted to control a first AC current provided by said inverter stage, said third control arrangement adapted to:
receive and process a current reference signal indicative of desired values for said first AC current and a current detection signal indicative of measured values of said first AC current, said current detection signal provided by a current sensing arrangement included in said inverter stage; and
provide a second control signal to control operation of at least one of said first and second rectifying stages and said DC-bus stage, said third control arrangement adapted to calculate said second control signal by correcting said first control signal, said first control signal provided by said second control arrangement, based on said current reference signal and said current detection signal.

8. The power transfer system, according to claim 7, wherein said control architecture comprises a fourth control arrangement adapted to:
receive and process at least one of said first and second temperature detection signals;
provide said current reference signal to said third control arrangement; and
select said current reference signal based on temperature values measured by at least one of said first and second temperature sensing arrangements.

9. A method for controlling a power transfer system for exchanging electric power between an electric power system and a battery of an electric vehicle, said power transfer system comprising:
a transmitter-side power sub-system comprising a first rectifying stage electrically coupleable with said electric power system, a DC-bus stage electrically coupled with said first rectifying stage and adapted to provide a first DC power and an inverter stage electrically coupled with said DC-bus stage and adapted to receive said first DC power and provide a first AC power;
a transmitter-side coil sub-system electrically coupled with said inverter stage and adapted to receive said first AC power, said transmitter-side coil sub-system comprising a transmitter coil adapted to receive a first AC current and a first temperature sensing arrangement configured to provide first temperature detection signals indicative of operating temperatures of said transmitter-side coil sub-system;
one or more transmitter-side controllers adapted to control operation of said transmitter-side power sub-system and said transmitter-side coil sub-system;
a receiver-side coil sub-system comprising a receiver coil inductively coupleable with said transmitter coil and a second temperature sensing arrangement configured to provide second temperature detection signals indicative of operating temperatures of said receiver-side coil sub-system, said receiver-side coil sub-system being adapted to exchange an AC power with said transmitter-side coil sub-system; and
a receiver-side power sub-system comprising a second rectifying stage electrically coupled with said receiver-side coil sub-system and adapted to exchange a second AC power with said receiver-side coil sub-system, said second rectifying stage being electrically coupleable with said battery and adapted to provide a second DC power to said battery;
one or more receiver-side controllers adapted to control operation of said receiver-side coil sub-system and receiver-side power subsystem, said transmitter side and receiver side controllers adapted to mutually communicate through a wireless communication channel,
wherein said method is operable by a control architecture comprising said transmitter-side and receiver-side controllers, said method for controlling said second DC power received by said battery as a function of the operating temperatures measured by said first and second temperature sensing arrangements, said method comprising:
receiving and processing, by a first control arrangement of said control architecture, at least one of said first and second temperature detection signals and a first power reference signal for said second DC power;
providing, by said first control arrangement, a second power reference signal for said second DC power;
calculating, by said first control arrangement, said second power reference signal by correcting said first power reference signal based on at least one of said first and second temperature detection signals;
controlling, by a second control arrangement, said second DC power received by said battery;
receiving, by said second control arrangement, said second reference power signal from said first control arrangement and
processing, by said second control arrangement, said second power reference signal and providing a first control signal to control operation of said first rectifying stage and said DC-Bus stage, thereby controlling the second DC power received by said battery.

10. The method according to claim 9, wherein said first control arrangement is implemented at a level of said one or more transmitter-side controllers, said method further comprising:
receiving, by said transmitter-side controllers, said first power reference signal and said second temperature detection signals from said one or more receiver-side controllers through said wireless communication channel.

11. The method according to claim 9, wherein said first control arrangement is implemented at a level of said one or more transmitter-side controllers and at a level of said one or more receiver-side controllers, wherein said method further comprises:

receiving, by said transmitter-side controllers, a third power reference signal from said one or more receiver-side controllers through said wireless communication channel, said third power reference signal calculated by correcting said first power reference signal based on said second temperature detection signals.

12. The method according to claim 9, wherein said control architecture further comprises a third control arrangement, said method further comprising:

controlling, by said third control arrangement, a first AC current provided by said inverter stage by receiving and processing a current reference signal indicative of desired values for said first AC current and a current detection signal indicative of measured values of said first AC current, which is provided by a current sensing arrangement included in said inverter stage;

providing, by said third control arrangement, a second control signal to control operation of at least one of said first and second rectifying stages and said DC-bus stage; and calculating, by said third control arrangement, said second control signal by correcting said first control signal, said first control signal provided by said second control arrangement, based on said current reference signal and said current detection signal.

13. The method of claim 12, wherein said control architecture comprises a fourth control arrangement, said method further comprising:

receiving and processing, by said fourth control arrangement, at least one of said first and second temperature detection signals;

providing, by said fourth control arrangement, said current reference signal to said third control arrangement; and selecting, by said fourth control arrangement, said current reference signal based on temperature values measured by at least one of said first and second temperature sensing arrangements.

\* \* \* \* \*